(12) United States Patent
Rodgers (10) Patent No.: US 7,399,337 B2
(45) Date of Patent: Jul. 15, 2008

(54) CONTINUOUS AIR MONITOR FILTER CHANGEOUT APPARATUS

(75) Inventor: John C. Rodgers, Santa Fe, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 501 days.

(21) Appl. No.: 11/059,096

(22) Filed: Feb. 16, 2005

(65) Prior Publication Data

US 2006/0180021 A1    Aug. 17, 2006

(51) Int. Cl.
*B01D 45/00* (2006.01)
*B65G 53/14* (2006.01)
*F41B 7/00* (2006.01)

(52) U.S. Cl. .............................. 95/25; 55/351; 55/352; 55/353; 55/354; 406/153; 406/144; 406/28; 406/177; 95/277; 95/273; 95/18; 95/223

(58) Field of Classification Search ........... 55/351–354, 55/422, 481; 95/277, 273
See application file for complete search history.

(56) References Cited

U.S. PATENT DOCUMENTS

| 3,515,111 | A | * | 6/1970 | Auge | .......................... 124/16 |
| 4,497,642 | A | * | 2/1985 | Hackney | ....................... 55/422 |
| 6,261,030 | B1 | * | 7/2001 | Rassman et al. | ............. 406/153 |
| 7,186,290 | B2 | * | 3/2007 | Sheehan et al. | ................ 95/277 |

* cited by examiner

*Primary Examiner*—Duane Smith
*Assistant Examiner*—Ives Wu
(74) *Attorney, Agent, or Firm*—Mark N. Fitzgerald; Juliet A. Jones (57) ABSTRACT

An apparatus and corresponding method for automatically changing out a filter cartridge in a continuous air monitor. The apparatus includes: a first container sized to hold filter cartridge replacements; a second container sized to hold used filter cartridges; a transport insert connectively attached to the first and second containers; a shuttle block, sized to hold the filter cartridges that is located within the transport insert; a transport driver mechanism means used to supply a motive force to move the shuttle block within the transport insert; and, a control means for operating the transport driver mechanism.

6 Claims, 11 Drawing Sheets

CONTINUOUS AIR MONITOR FILTER CHANGEOUT APPARATUS

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to continuous air monitors, and, more particularly, to an apparatus that provides for automated filter change-out in a continuous air monitor.

BACKGROUND OF THE INVENTION

The Canberra Instrument Company, Inc. currently produces the Alpha Sentry CAM, and the Canberra Aquila Technologies Group currently produces the alpha-ECAM for the radiological air monitoring community. The present invention is an apparatus that provides for automated filter change in continuous air monitors (CAMs); including, the Alpha Sentry CAM and the Alpha Environmental Continuous Air Monitor (ECAM) utilizing the Quick Change Filter Cartridge (QCFC) filter holder.

The fact that the Alpha Sentry CAM and the ECAM use the Quick Change Filter Cartridge for handling filters created a unique opportunity to design a simple retrofit filter changing apparatus for these CAMs. The QCFC not only holds and positions the filter in the CAM head, it also provides the porous filter backing disk, so once the filter is inserted into the cartridge and the cap pressed on, all handling, positioning, or sealing requirements are taken into account except for insertion of the cartridge into the CAM head.

The user is enabled to pre-load a number of filter cartridges with pre-cut filter paper and insert them in the subject invention. Following initiation of the filter change process, all subsequent filter changes are executed automatically under the control of the embedded controller or PC in the CAM or ECAM. The user can initiate filter change just as is currently provided for in the CAM/ECAM user interface program, or by the detection of a condition such as unacceptably low flow using the built-in flow meter signal, at which time a filter change sequence would begin. In either circumstance, the actual process of used filter cartridge extraction and storage, and insertion of a fresh filter, would be carried out by the present invention without user handling. Thus, the present invention makes possible autonomous filter change outs at remote sites using the built-in network communication capability of the monitor.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes an apparatus and corresponding method for automatically changing out a filter cartridge in a continuous air monitor. The apparatus includes: a first container sized to hold filter cartridge replacements; a second container sized to hold used filter cartridges; a transport insert connectively attached to the first and second containers; a shuttle block, sized to hold the filter cartridges that is located within the transport insert; a transport driver mechanism means used to supply a motive force to move the shuttle block within the transport insert; and, a control means for operating the transport driver mechanism.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention was created to meet an expressed need for automated filter changing capability, where remote environmental settings or adverse conditions may make filter changing a costly and time-consuming process. The present invention makes it possible to reduce the support time requirement in a monitored facility or environmental monitored network by allowing a week's or a month's supply of filters (depending on dust loading conditions) to be set up at one time.

Figure 1:
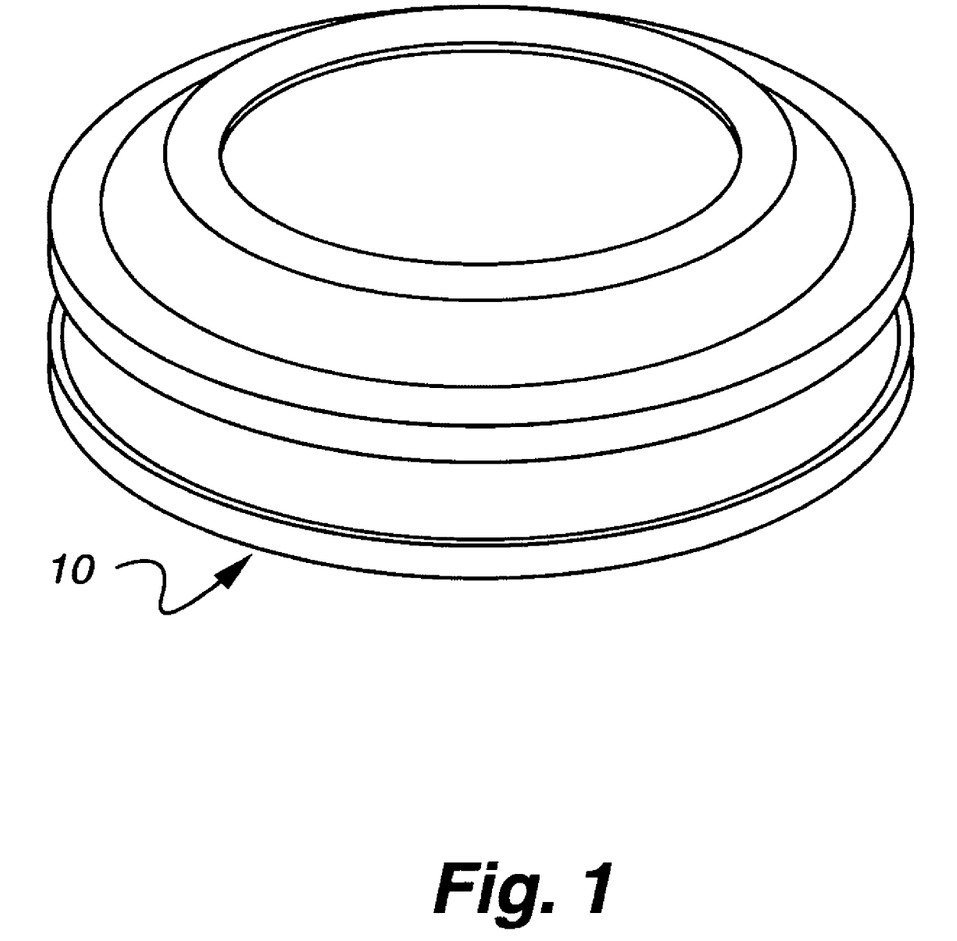
FIG. 1 is a pictorial illustration of one embodiment of a CAM filter cartridge that the present invention can be used to replace automatically.

FIG. 1 shows one embodiment of a CAM filter cartridge that is used for collecting radiological air samples. In this embodiment, a filter cartridge 10 is round with beveled edges that allow proper centering under a detector within a CAM during mechanical handling. However, any shape configuration may be used for filter cartridge 10, so long as the shape does not interfere with smooth handling during mechanical operations. Generally, air monitor filters used in real-time monitoring applications exhibit a circular geometry, ranging in size from 1" to 8".

Figure 2:
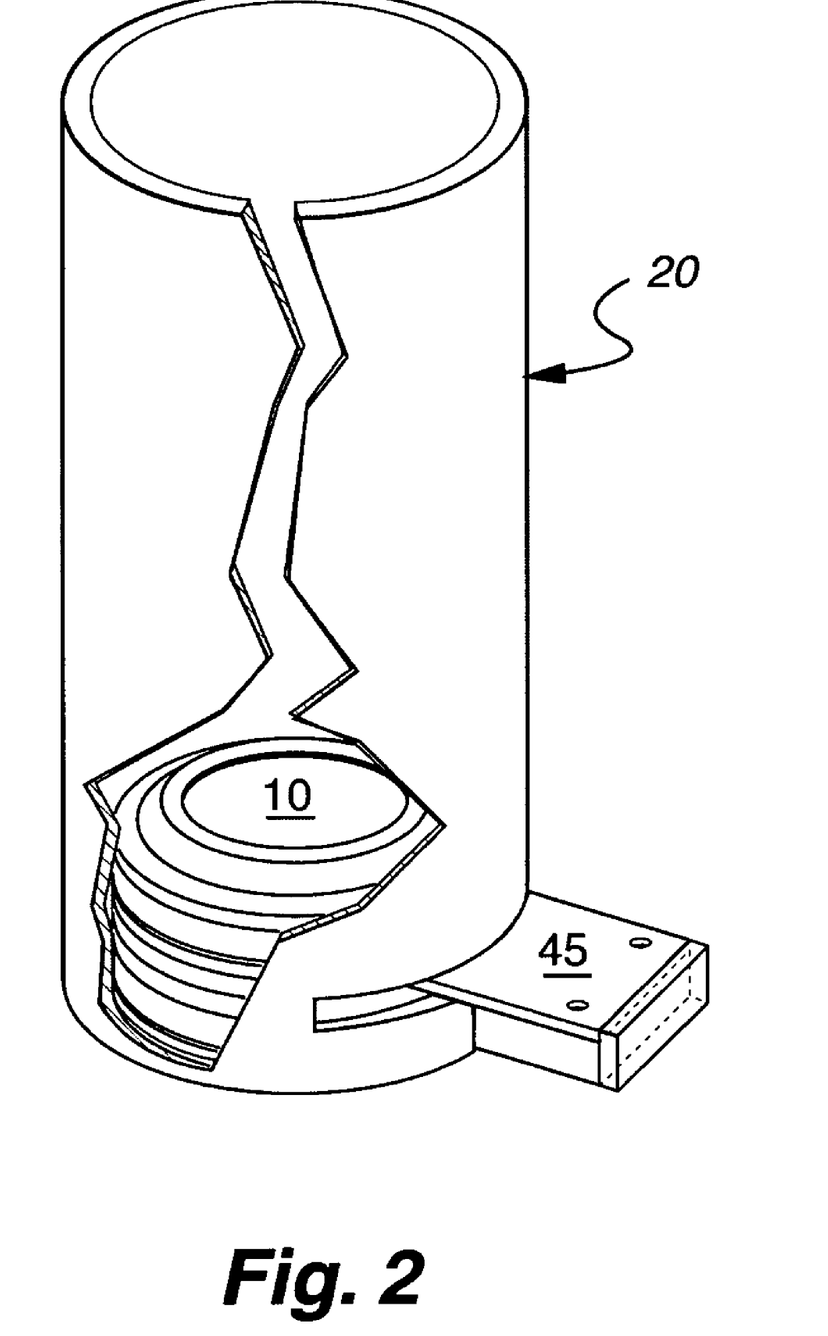
FIG. 2 is a pictorial illustration of one embodiment of a feed container used to store replacement CAM filter cartridges.

FIG. 2 shows one embodiment of feed container 20, which is sized appropriately to hold replacement filter cartridges 10. Replacement filter cartridges 10 are stacked within feed container 20, where the vertical dimension of feed container 20 is the only limiting factor on the number of cartridges that may be stored. Also, shown is latch 45, which separates one filter cartridge 10 from the stack of cartridges at a time for transport into an attached CAM.

Figure 3A:
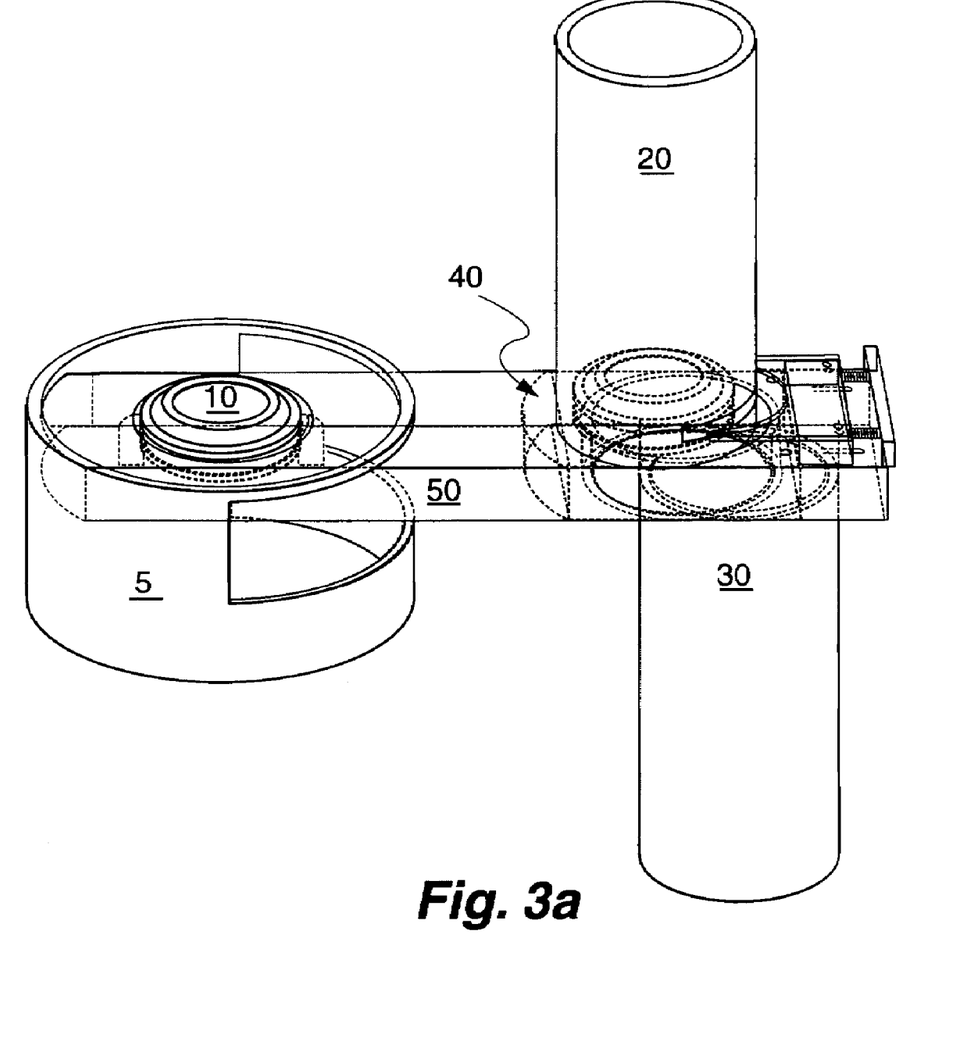
FIG. 3a is a pictorial illustration of a top loading feed container embodiment.

Referring now to FIG. 3*a*, feed container 20 is connectively attached in a gravity feed position to transport insert 50. Transport insert 50 is an enclosed rectangular tray (metal or plastic) sized to fit into and connectively attach to CAM 5. Transport insert 50 serves as a guide element for cartridge shuttle block 40, located within insert 50, and provides a moving platform chassis on which the operations of loading, shuttling, and discharging filter cartridges 10 occurs. Discharge container 30 is also connectively attached to transport insert 50, and serves the function of holding replaced filter cartridges 10 until collected by personnel.

Figure 3B:
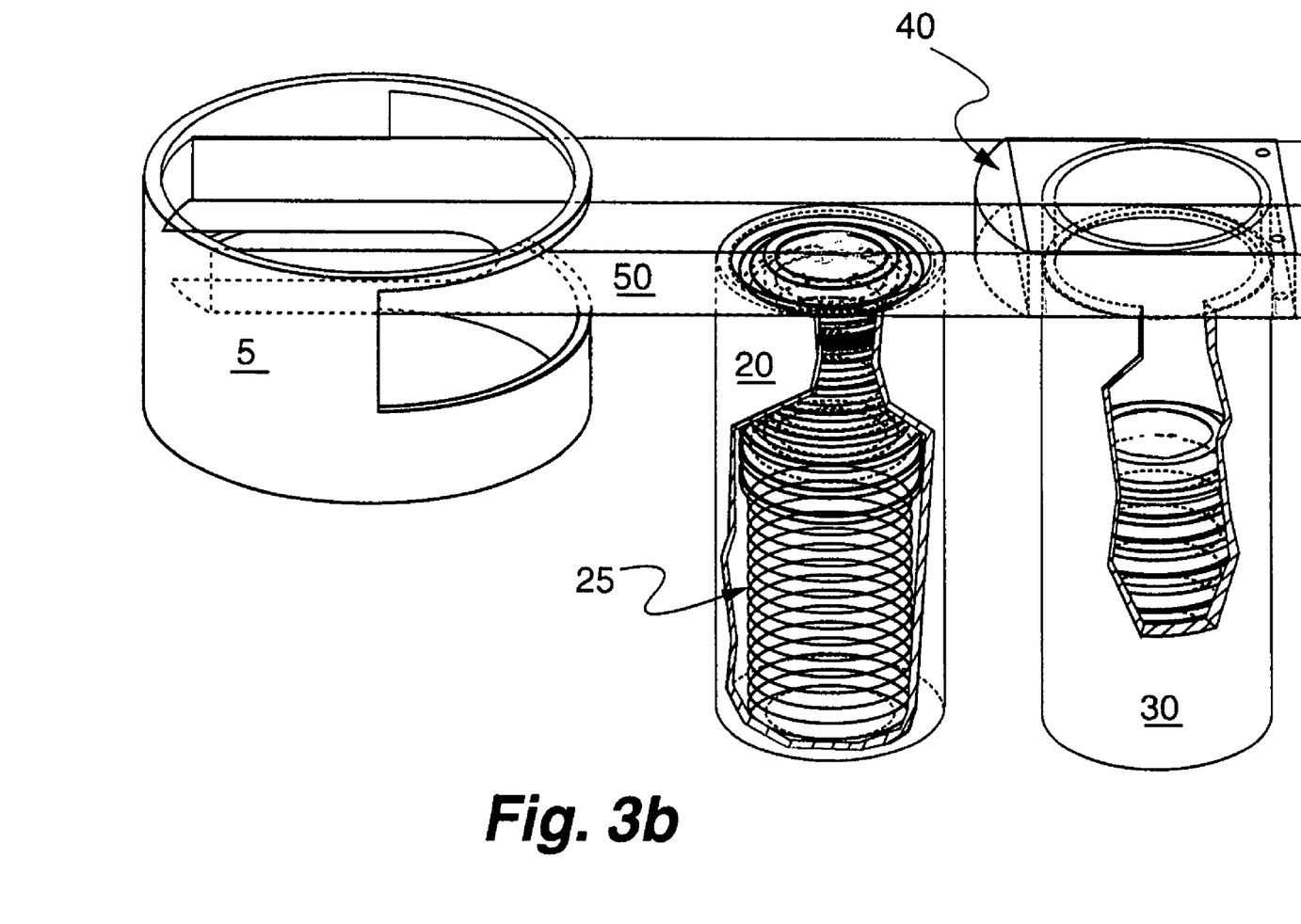
FIG. 3b is a pictorial illustration of a bottom loading feed container embodiment.

FIG. 3*b* shows another embodiment of the present invention, where feed container 20 is placed below transport insert 50 and spring 25 is used to supply the upward motive force to load new replacement cartridges into cartridge shuttle block 40.

Figure 4:
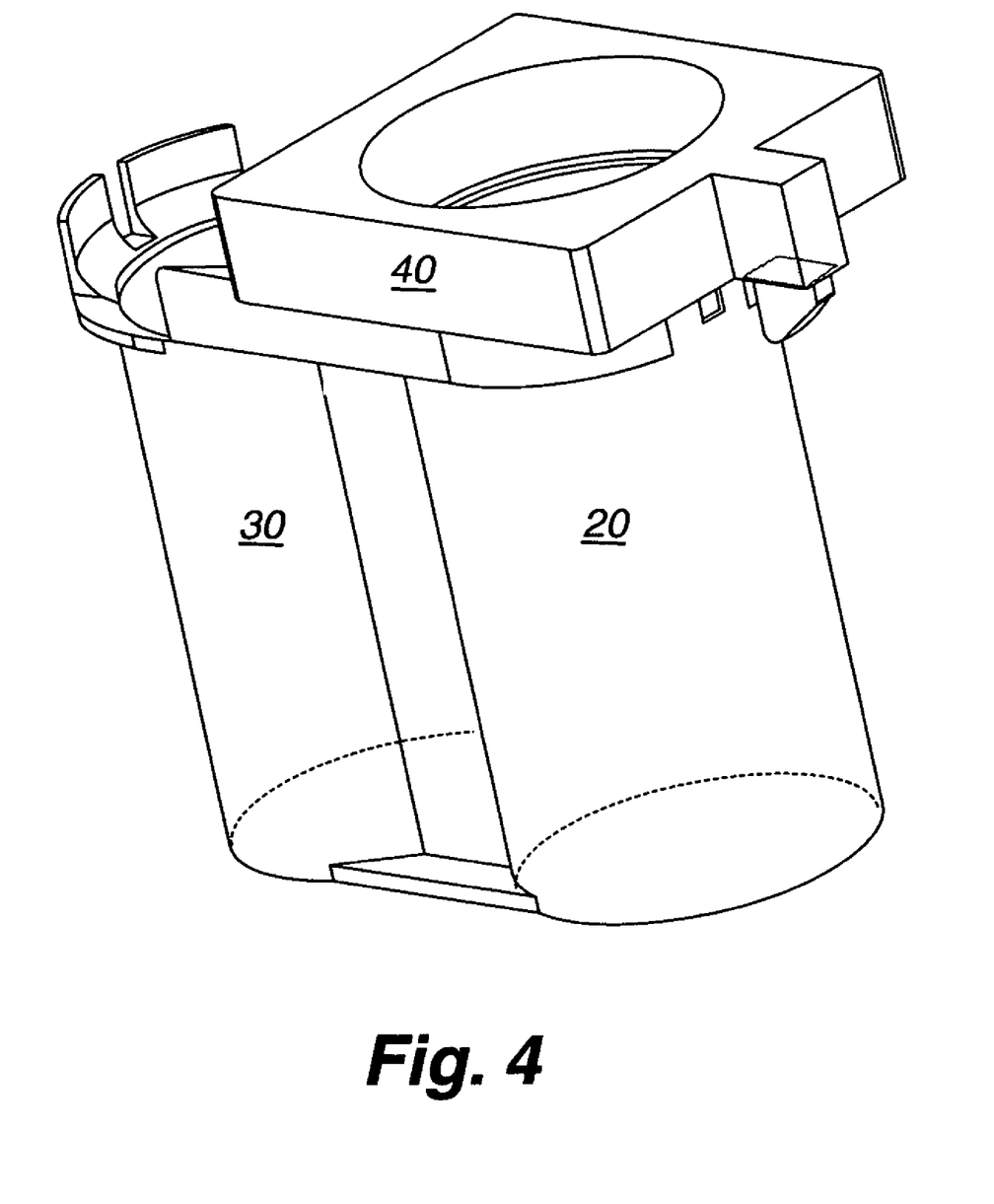
FIG. 4 is a pictorial illustration of a one-piece bottom loading feed container.

Feed container 20 is used for loading and staging of replacement filter cartridges 10 and discharge container 30 is used for accumulation of discharged filter cartridges 10. Both feed container 20 and discharge container 30 are of suitable diameter to accept filter cartridges for used in automated filter changes. Note that in an alternative embodiment, feed container 20 and discharge container 30 may be manufactured as one piece, as shown in FIG. 4.

Figure 5:
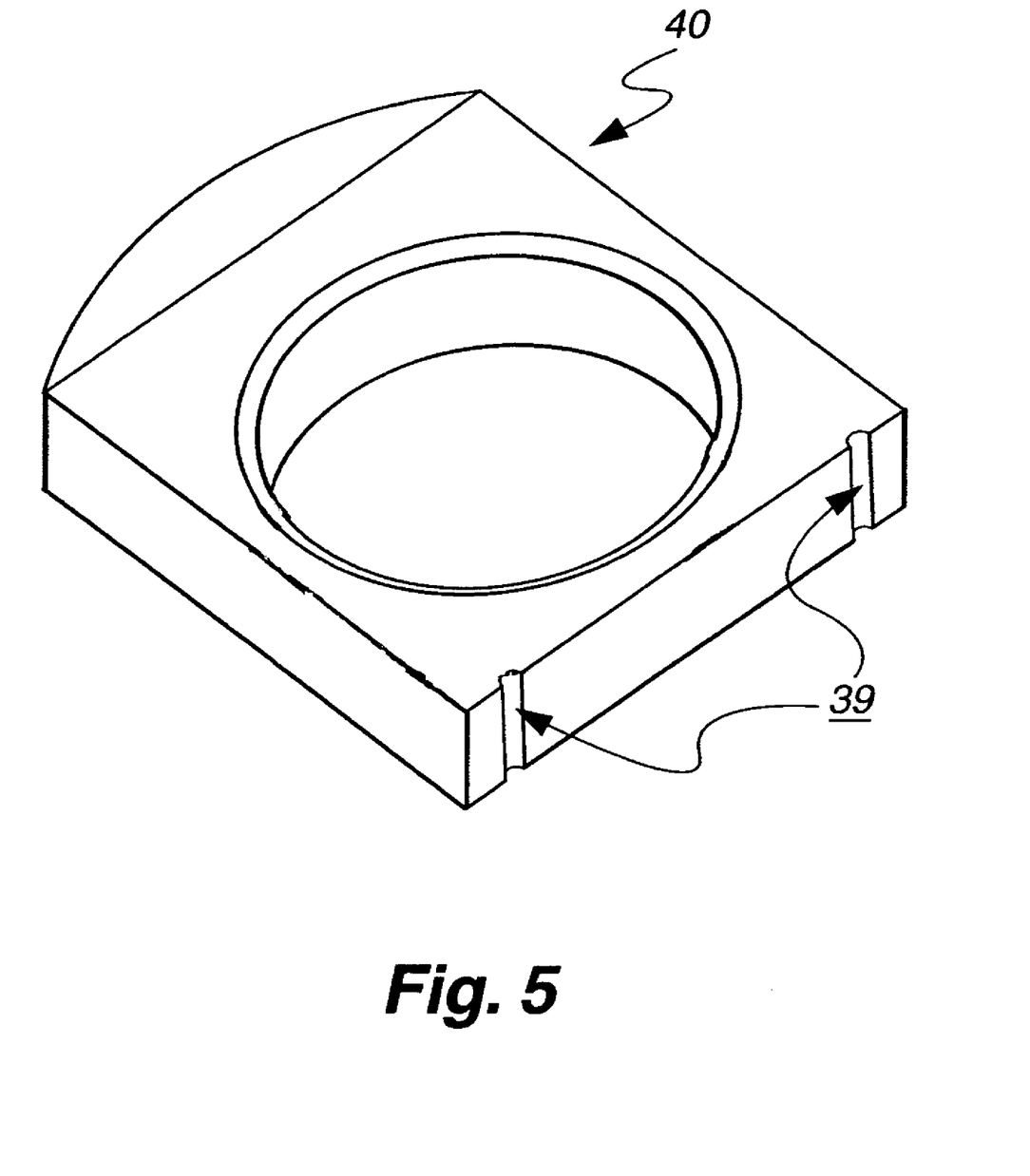
FIG. 5 is a pictorial illustration of an embodiment of a shuttle block.

FIG. 5 shows an embodiment of shuttle block 40 used to capture and transfer used and replacement cartridges 10. This embodiment would be used for replacement cartridges 10 that exhibit a circular design. Other embodiments may be fashioned for other cartridge 10 geometries. Shuttle block 40 may comprise any suitable material (i.e., metal or plastic) sized to fit within transport insert 50, with a defined central opening to accept and capture filter cartridges 10.

Figure 6A:
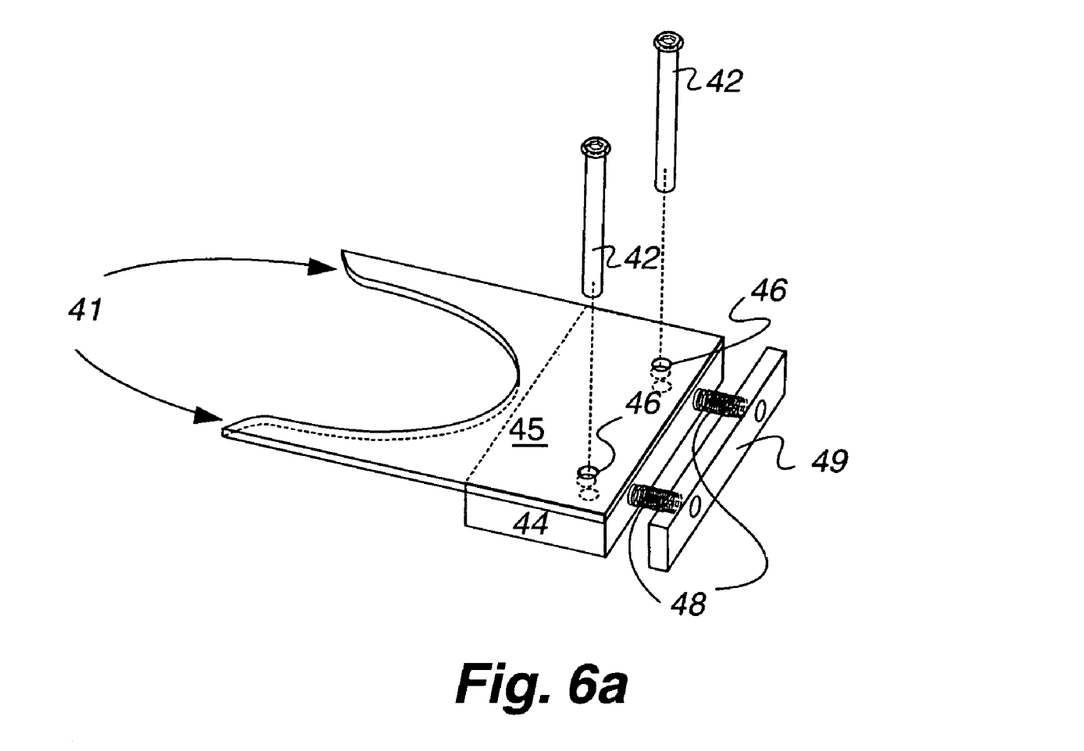
FIGS. 6a and 6b are pictorial illustrations of an embodiment of a latching mechanism.

FIG. 6*a* shows an embodiment of a latching mechanism that functions to capture and stage cartridges 10 in feed container 20 during the loading process, such that only one cartridge 10 is inserted into radiation monitor 5 at a time. Latch piece 45 is mounted on block piece 44 to facilitate a spring-loaded approach to insertion and recovery of latch piece 45 from between cartridges in feed container 20. In this embodiment, latch 45 includes two finger projections 41 that slide between successive cartridges 10 in feed container 20 and hold non-selected stack of cartridges 10 from moving, while the selected cartridge 10 is loaded into shuttle block 40 into CAM 5.

Figure 6B:
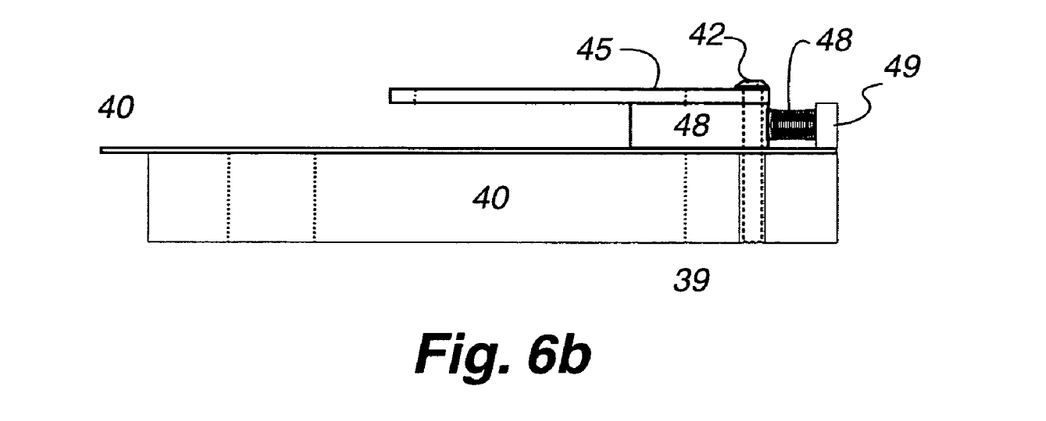

Referring now to FIG. 6*b*, backpiece 49 is secured to transport insert 50, and springs 48 push latch piece 45 towards feed container 20 as shuttle block 40 moves towards CAM 5. When shuttle block 40 is moving back towards discharge container 30, pins 42 that protrude down through holes 46 into the interior of transport insert 50, are engaged by formed pieces 39 (reference FIG. 5) on the back of shuttle block 40. Thus, as shuttle block 40 continues movement towards discharge container 30, latch piece 45 is pushed away from feed container 20, allowing the stack of replacement cartridges to moved down by the pull of gravity, and thereby readying another cartridge 10 for replacement use.

Figure 7:
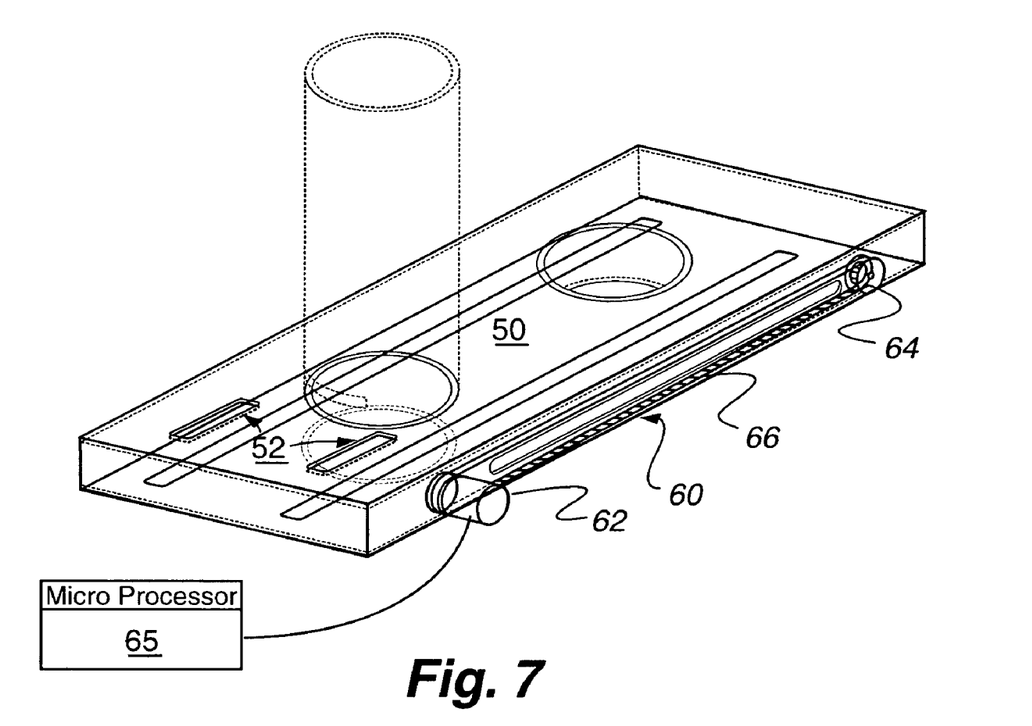
FIG. 7 is a pictorial illustration of a transport insert.

FIG. 7 shows an embodiment of transport insert 50. As previously stated, shuttle block 40 (not shown) is located within transport insert 50 and is coupled to transport driver mechanism means 60, which may be, as in this embodiment, motor 62 with pulley 64 and belt 66. Other motive means may be used as driver mechanism, to include a screw drive driven by a stepper motor or digital pulse control of a small motor or servomotor. Motor 60 is typically controlled using microprocessor 65, or other suitable electrical/mechanical control means known to those skilled in the art, to achieve proper positioning of shuttle block 40 during operation. Slots 52 allow pins 42 (reference FIG. 6*a/b*) to extend down to make contact with shuttle block 40.

Figure 8:
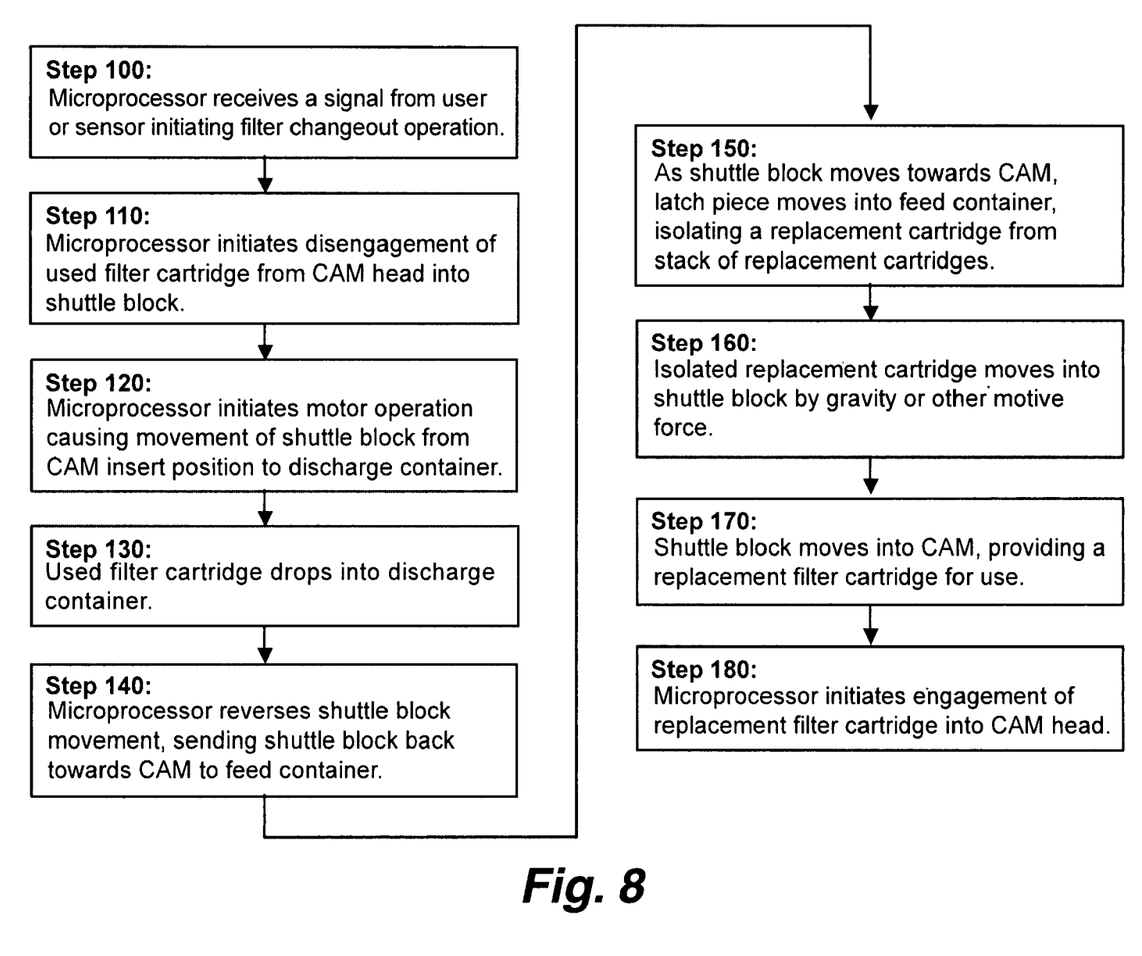
FIG. 8 is a flow chart describing the method of removing a spent cartridge and replacing it with a fresh cartridge.

FIG. 8 is a flow chart describing the method of removing a spent cartridge and replacing it with a fresh cartridge:

In Step 100, a computer program interrupt generated by a flow sensor signal, programmed elapsed time signal, or user command signals microprocessor 65 to initiate a filter change out operation. The interrupt is usually based on a flow sensor measurement of reduced volumetric flow below a user-defined low-flow level, but also is frequently initiated by a user-initiated filter change command.

In Step 110, microprocessor 65 initiates disengagement of used filter cartridge 10 from CAM 5, typically this is performed by removing a vacuum condition within CAM 5 that holds cartridge 10 in place.

In Step 120 a signal from controlling microprocessor 65 initiates movement of shuttle block 40 that contains used/spent filter cartridge 10 from CAM 5 along transport insert 50 until shuttle block 40 reaches discharge container 30. During this movement, shuttle block 40, engages pins 42, and pushes latch piece 45 away from feed container 20, allowing the stack of replacement cartridges to move down.

In Step 130, once centered over discharge container 30, used filter cartridge 10 simply drops into discharge container 30 from shuffle block 40.

In Step 140, a signal is sent to the microprocessor to reverse movement of shuttle block 40. The signal may be generated by any means known to those skilled in the art, for example from a limit switch, optical rotation encoder, or a computer program that logs the progress of shuttle block 40.

In Step 150, shuttle block 40 moves back towards CAM 5, and springs 48 provide the motive force to slide latch piece 45 back to, and insert in, feed container 20, thereby isolating a replacement cartridge from the stack of replacement cartridges.

In Step 160 the isolated replacement cartridge moves into shuttle block, either by gravity feed or some other motive force like a spring.

In Step 170 shuttle block 40 moves along transport insert 50 and into CAM 5, providing a fresh filter cartridge for use. Note that an infra-red LED beam interrupt system could be used to detect filter movement out of the stack in the cartridge feed tube. The interrupt system would indicate that the stack supply has been exhausted (providing a "stack empty" signal), and in addition, it would take care of the situation where a cartridge got stuck in the process of loading, in which case an "service error" signal would be generated.

Finally, in Step 180, microprocessor 65 initiates engagement of replacement filter cartridge 10, typically by creating a vacuum condition within CAM 5.

Figure 9:
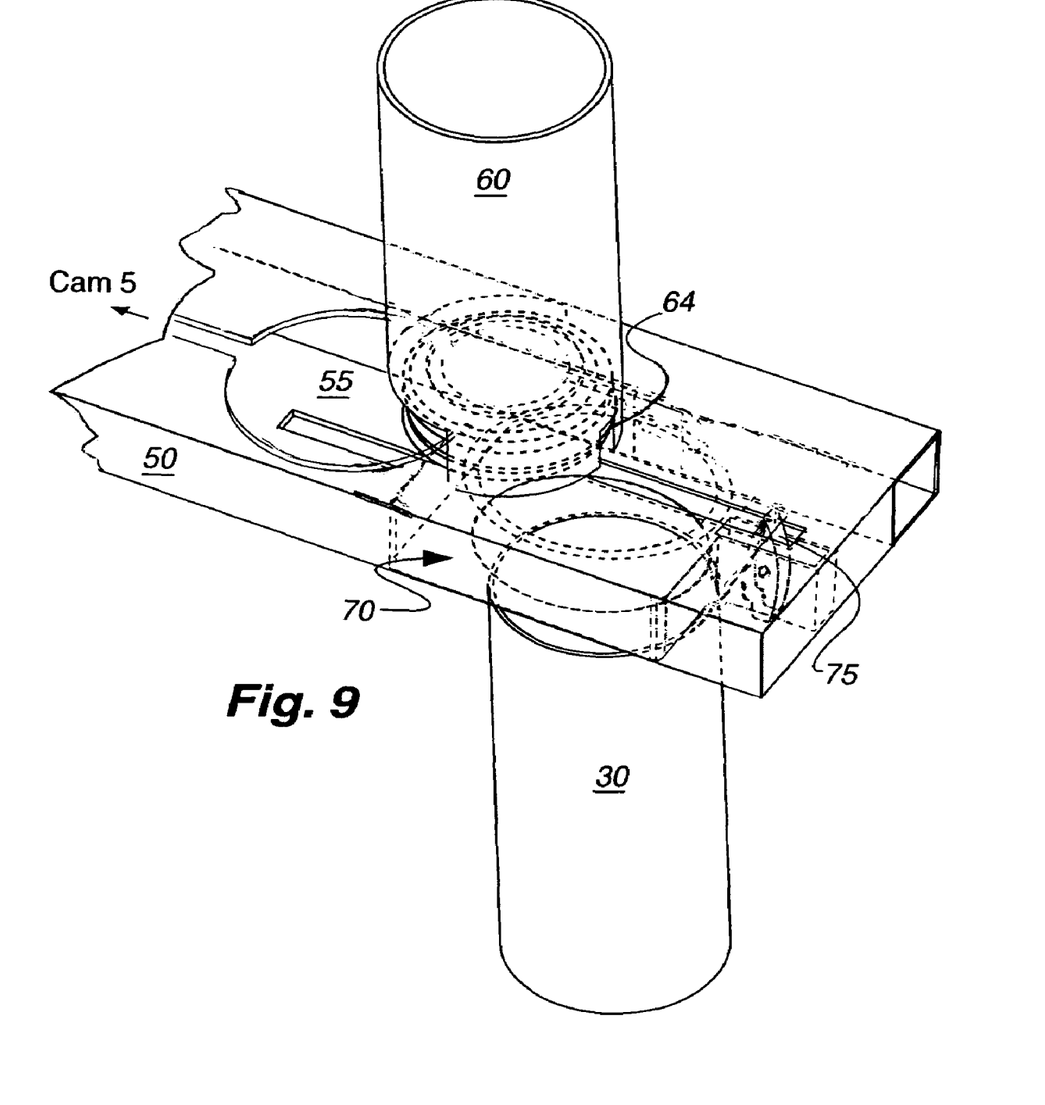
FIG. 9 is a pictorial illustration of another embodiment of a feed container.
Figure 10A:
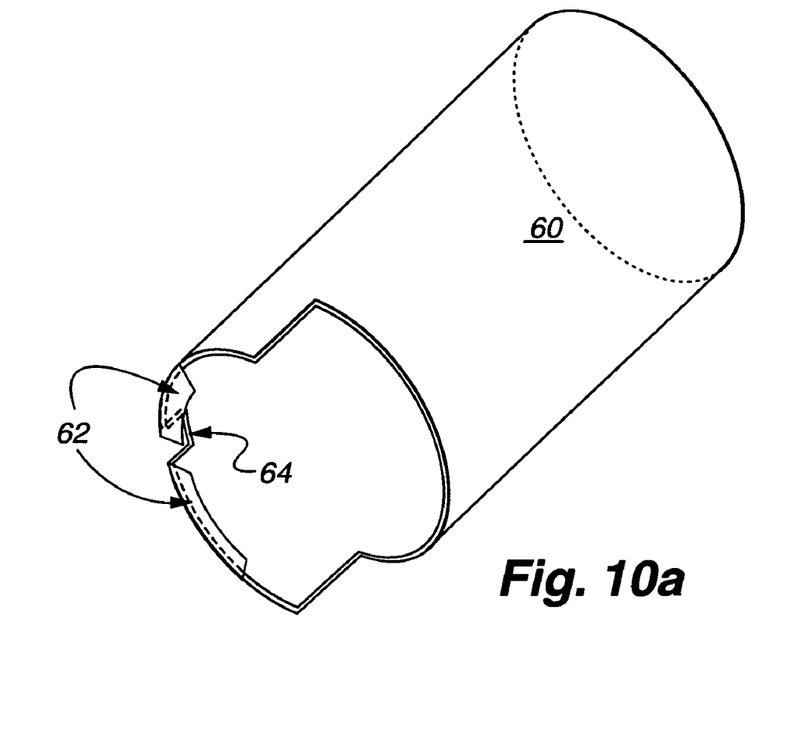
FIGS. 10a and 10b are pictorial illustrations of another embodiment of a shuttle block and feed container.
Figure 10B:
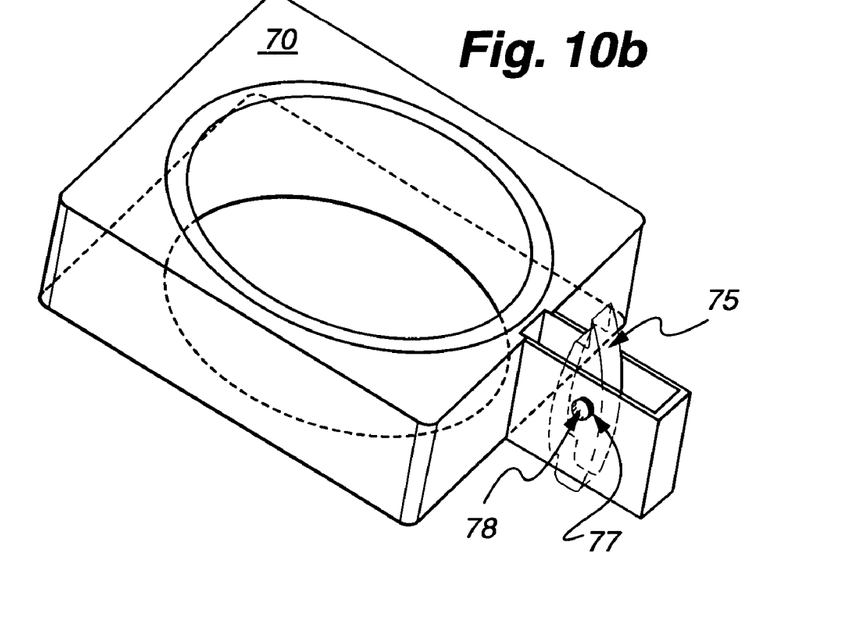

FIGS. 9, 10*a*, and 10*b* show another embodiment for selecting a replacement cartridge from a stack of fresh cartridges. In this embodiment, spring loaded latch 75, located on shuffle block 70 swivels, depending on the direction of motion of shuttle block 70. As shuttle block 70 moves towards feed container 60, latch 75 is in the upright position shown in both FIGS. 9 and 10*b*. As latch 75 moves into and through feed container 60 towards CAM 5, latch 75 pushes a replacement cartridge out of feed container 60 and over opening 55, where the replacement cartridge drops down into shuttle block 70. Shuttle block 70 then continues on, as in the first embodiment, into CAM 5. Feed container 60 includes lip feature 62 that holds cartridges 10 in feed container 60, serving the same function as latch piece 45 (FIG. 6*a*) in the previous embodiment. Notch 64 allows the passage of latch 75 through feed container 60, while latch 75 is in the upright position.

When moving a used/spent cartridge towards discharge container 30, shuttle block 70 must move under feed container 60. In order to perform this operations, latch 75 is designed with a curved surface that contacts the replacement stack of cartridges 10 in feed container 60 and swivels towards shuttle block 70 and below feed container 60, in order to allow shuttle block 70 to move freely below feed container 60. Once latch 75 exits from beneath feed container 60, spring 77 provides the motive force to push latch 75 back into the upright position.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for automatically changing out a filter cartridge in a continuous air monitor, comprising:
   a. a first container sized to hold filter cartridge replacements,
   b. a second container sized to hold used filter cartridges,
   c. a transport insert operatively connected to said continuous air monitor, said first container, and said second container,
   d. a shuttle block, sized to hold said filter cartridge replacements and said used filter cartridges, located within said transport insert,
   e. a transport driver mechanism means connectively attached to said shuttle block to move said shuttle block within said transport insert, and
   f. a control means for operating said transport driver mechanism.

2. The apparatus of claim 1 where said shuttle block comprises a latch and a first spring for pushing said filter cartridge replacements out of said first container, and where said first container comprises a lip for holding said filter cartridge replacements and a notch to allow passage of said latch through said first container in an upright position.

3. The apparatus of claim 1 where said first container comprises a second spring used to supply an upward motive force on said filter cartridge replacements when said first container is operatively connected below said transport insert.

4. The apparatus of claim 1 where said transport drive mechanism means is selected from the group consisting of: a motor, a pulley, and a belt; a screw drive driven by a stepper motor; a screw drive driven by digital pulse control of a small motor; and a screw drive driven by digital pulse control of a servomotor.

5. The apparatus of claim 1 where said controls means is a microprocessor.

6. A method for automatically changing out a filter cartridge in a continuous air monitor, comprising:
   a. determining when said a first filter cartridge needs replacement,
   b. actuating a shuttle block to remove said first filter cartridge by moving the shuttle block within a transport insert,
   c. removing said first filter cartridge from said shuttle block to a first container,
   d. accepting a second filter cartridge from a second container into said shuttle block, and
   e. transporting said second filter cartridge into said continuous air monitor.

\* \* \* \* \*